US008931191B2

(12) United States Patent
Masanek, Jr. et al.

(10) Patent No.: US 8,931,191 B2
(45) Date of Patent: Jan. 13, 2015

(54) OVERMOLDED VEHICLE LICENSE PLATE FRAME AND BUMPER ASSEMBLY (71) Applicant: MacNeil IP LLC, Bolingbrook, IL (US)

(72) Inventors: Frederick W. Masanek, Jr., Barrington, IL (US); David F. MacNeil, Hinsdale, IL (US)

(73) Assignee: MacNeil IP LLC, Bolingbrook, IL (US)

( * ) Notice: Subject to any disclaimer, the term of this patent is extended or adjusted under 35 U.S.C. 154(b) by 0 days.

(21) Appl. No.: 14/341,275

(22) Filed: Jul. 25, 2014

(65) Prior Publication Data

US 2014/0331530 A1  Nov. 13, 2014

(51) Int. Cl.
G09F 7/00 (2006.01)
B60R 13/10 (2006.01)

(52) U.S. Cl.
CPC .................... B60R 13/105 (2013.01)
USPC ............................... 40/209; 40/700

(58) Field of Classification Search
CPC ......... B60R 13/105; B60R 13/10; G09F 7/18; G09F 21/04; G09F 2007/1895
USPC ............................. 40/700, 209; 52/847, 656.1
See application file for complete search history.

(56) References Cited

U.S. PATENT DOCUMENTS

| 1,664,302 | A |  | 3/1928 | Leopold et al. |  |
|---|---|---|---|---|---|
| 2,082,434 | A |  | 6/1937 | White |  |
| D164,008 | S |  | 7/1951 | Loyd |  |
| 2,853,818 | A |  | 9/1958 | Simon et al. |  |
| 2,921,395 | A |  | 1/1960 | Fishman |  |
| 3,304,642 | A |  | 2/1967 | Dardis |  |
| 3,315,394 | A |  | 4/1967 | Kluck |  |
| 3,611,605 | A |  | 10/1971 | Baker |  |
| 4,462,176 | A | * | 7/1984 | Schovee | 40/700 |
| 4,730,404 | A |  | 3/1988 | Utsch |  |
| 4,891,895 | A |  | 1/1990 | DeLaquil, Jr. |  |
| 4,924,611 | A |  | 5/1990 | Shaw |  |
| D311,167 | S |  | 10/1990 | Ching-Hwei |  |
| 5,381,618 | A |  | 1/1995 | Singleton |  |
| 5,428,911 | A |  | 7/1995 | Figone et al. |  |
| 5,819,458 | A | * | 10/1998 | Hadden | 40/782 |
| D408,341 | S |  | 4/1999 | Spencer |  |
| 6,262,807 | B1 |  | 7/2001 | Pleotis |  |
| D489,031 | S |  | 4/2004 | Leibman |  |
| 6,832,444 | B1 |  | 12/2004 | MacNeil |  |
| D502,434 | S |  | 3/2005 | Leibman |  |
| 6,962,013 | B1 |  | 11/2005 | Perrin |  |
| 7,168,194 | B2 |  | 1/2007 | Yen |  |
| 7,210,255 | B2 |  | 5/2007 | Blackburn |  |
| 7,316,433 | B2 |  | 1/2008 | Levine |  |
| 7,383,649 | B2 |  | 6/2008 | MacNeil |  |
| D590,311 | S |  | 4/2009 | Pacleb |  |
| 7,607,248 | B2 |  | 10/2009 | MacNeil |  |
| D625,234 | S |  | 10/2010 | Vuletic |  |
| 8,567,599 | B2 | * | 10/2013 | Beatty et al. | 206/320 |

(Continued)

Primary Examiner — Casandra Davis
(74) Attorney, Agent, or Firm — Perkins IP Law Group LLC; Jefferson Perkins (57) ABSTRACT

A vehicle license plate frame and bumper assembly has a substrate formed of a high-durometer first polymer compound, and an overmold component formed of a lower-durometer, second polymer compound that is chemically compatible with the first polymer compound. The substrate includes an endless frame with forward, inner and outer faces, and license plate screw mounting tabs inwardly extending from the frame. The overmold component includes a bumper cohesively bonded to the frame but not to screw head-receiving areas of the tabs.

11 Claims, 5 Drawing Sheets

(56) References Cited

U.S. PATENT DOCUMENTS

| | | |
|---|---|---|
| 2003/0192210 A1 | 10/2003 | Leibman |
| 2003/0196355 A1 | 10/2003 | Castro |
| 2005/0210721 A1 | 9/2005 | Blackburn |
| 2006/0156595 A1 | 7/2006 | Kasak et al. |
| 2012/0096747 A1 | 4/2012 | Lee Yang |
| 2012/0227294 A1 | 9/2012 | Weber |
| 2013/0047476 A1 | 2/2013 | Malina et al. |

* cited by examiner

OVERMOLDED VEHICLE LICENSE PLATE FRAME AND BUMPER ASSEMBLY

BACKGROUND OF THE INVENTION

Vehicle license plate frames and holders have existed in the automotive aftermarket for about as long as there have been vehicle license plates. More recently, the bumpers on vehicles, such as automobiles, sport utility vehicles, vans, minivans and light trucks, have become more notional and more susceptible to damage from even slight impacts. Vehicle bumpers used to be prominent structures fashioned of chrome-plated steel and offered some modicum of protection from low-velocity impacts, but now more typically are integrated with the vehicle body, are made of flexible plastic and are painted. A relatively low-velocity impact sustained by a conventional "bumper" may cause damage such as dimples, cracks or scratching that can only be remedied by an expensive visit to an auto body shop. In many instances, this damage is caused by the license plate, license plate frame and/or license plate mounting screws carried by the bumper of the impacting vehicle.

To address this problem, license plate frames and holders have been proposed that combine structure for holding and/or protecting a license plate with an elastomeric bumper element. These products take advantage of the fact that no matter how notional a vehicle "bumper" is, or how continuous it has been designed to be with the rest of the vehicle body, some provision must be made to affix a vehicle license plate to it, if only a pair of mounting screw holes—and these attaching means can therefore be used to affix a further protective element to the vehicle. Prior art combinations of license plate frames and bumper elements tend to be either fashioned of a single rubber material, or constituted by a license plate frame onto which has been glued one or more separately cured rubber elements. These prior art attempts may suffer from problems such as delamination and tearing or other physical failure, as it is difficult to find a single material that combines sufficient structural strength and sufficient elasticity when subjected to an impact.

SUMMARY OF THE INVENTION

According to one aspect of the invention, a vehicle license plate frame and bumper assembly is formed from a substrate component and an overmold component. The substrate is molded from a first polymer compound and the overmold component is molded from a second polymer compound which is chemically compatible with the first polymer compound. A hardness of the first polymer compound, once solidified, is greater than a hardness of the second polymer compound.

The substrate component may include an elongate, endless frame that is disposed around a sight of a vehicle license plate, the assembly disposed, in use, in a substantially vertical plane that is substantially orthogonal to the vehicle's axis of travel. The substrate component may further include a plurality of license plate mounting screw tabs that extend vertically inwardly from the frame. The overmold component may include a bumper that is overmolded onto the frame to extend at least axially forwardly therefrom, but the overmold component does not extend to cover screw head-receiving areas of the screw tabs.

In an embodiment, the first polymer compound is a thermoplastic elastomer (TPE) and more particularly can be a polyester polyether block copolymer TPE. In this or another embodiment, the second polymer compound is likewise a TPE and more particularly can be a polyester polyether block copolymer TPE.

In another aspect of the invention, a vehicle license plate frame and bumper assembly is formed from a substrate component and an overmold component, as before. The substrate component is formed from a first polymer compound and the overmold component formed from a second polymer compound that is chemically compatible with the first polymer compound but which, as solidified, has a hardness which is less than the first polymer compound. The substrate component includes an elongate, endless frame that is disposed around a sight of the vehicle license plate. A front surface of the frame has a forward face, an inner face which extends inwardly and rearwardly from the forward face, and an outer face which extends outwardly and rearwardly from the forward face. The overmold component includes a bumper which is overmolded onto all three of these faces of the frame, producing a strong cohesive bond between the two.

In an embodiment, a forward-extending, endless channel is formed in the rear surface of the frame, such that a thickness of the frame, as taken in a section orthogonal to a direction of its elongation, substantially conforms to a predetermined nominal wall thickness. At least one vent may be formed to extend from the front surface to the rear surface of the frame, and this vent may be disposed at or near an end-of-fill location on the frame opposite the overmold component fill point, such that advancing molten second polymer compound will push any gas in front of it and through the vent to the rear surface of the frame.

In an embodiment, the bumper of the overmold component may further include a lip which extends rearwardly from a rear plane that defines a rear limit of the substrate component. The lip may so extend by a distance which is at least as great as a predetermined thickness of a conventional embossed metal license plate.

One technical advantage of the invention is that the employed polymer compounds can be selected to have different properties. For example, the first polymer compound can be selected for toughness and tensile strength. The second polymer compound can be selected for impact resistance and elasticity. Intentionally omitting the overmold component from the screw head-receiving areas of the mounting screw tabs assures that only the relatively tough and deformation-resistant first polymer compound will receive any compression force exerted by the mounting screw heads, and that the higher tensile strength of the first polymer compound will better resist any force tending to tear the assembly off of the vehicle. The substrate further forms a multiple-face frame on which can be cohesively overmolded the bumper element, which can exhibit a higher elasticity and deformation than the first polymer compound, so as to better protect the vehicle upon which the device is mounted, the impacting vehicle, and the license plate. Formation of the substrate frame element as a channel permits the molding of the substrate to a substantially uniform nominal wall thickness, and further admits of the inclusion of one or more gas vents to remove gas in the overmolding step that would otherwise mar the finished product.

BRIEF DESCRIPTION OF THE DRAWINGS

Further aspects of the invention and their advantages can be discerned in the following detailed description, in which like characters denote like parts and in which.

DETAILED DESCRIPTION

Figure 1:
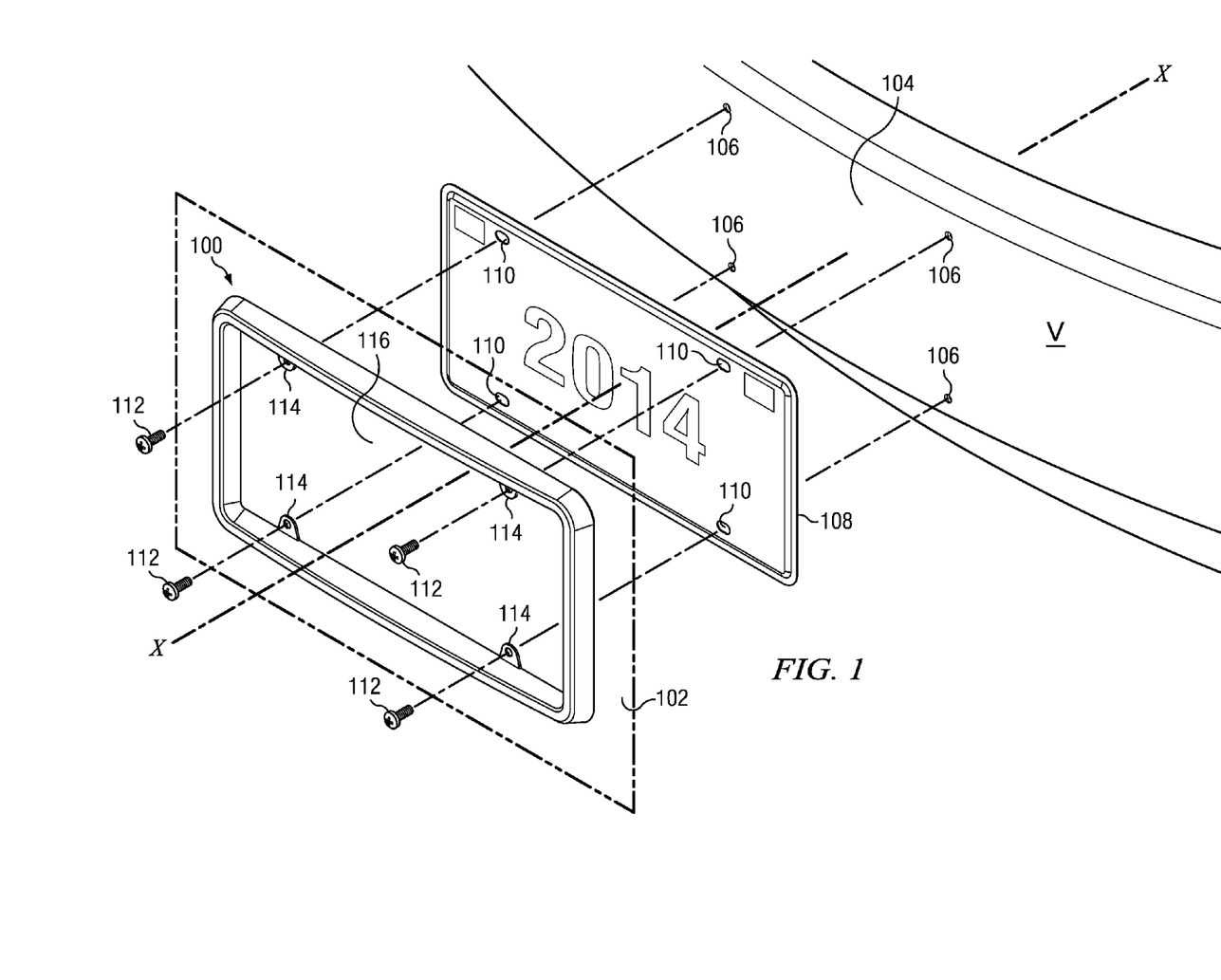
FIG. 1 is an exploded view of a vehicle license plate frame and bumper assembly according to the invention, as it would be installed on a front bumper of a vehicle.

As shown in FIG. 1, a license plate frame and bumper assembly 100 according to the invention is, in use, centered on an axis X. The assembly 100 generally resides in a substantially vertical plane 102 that is orthogonal to the axis X. While axis X typically is parallel to an axis of travel of a vehicle V to which assembly 100 is to be attached, and furthermore typically is in the centered on vehicle V, axis X might in some instances be canted to the horizontal, and some vehicle manufacturers choose to affix the license plate to vehicle V at an off-center location.

The vehicle V typically has a bumper 104 (here, a front bumper is shown) that provides screw-threaded license plate mounting holes 106. The mounting holes 106 may drilled directly into the bumper 104, as shown, or the manufacturer may instead provide a more elaborate niche, receptacle or mounting plate for the license plate 108, and in this last instance (not shown) the mounting holes 106 will be a portion of this more elaborate mounting structure. The license plate 108, in its conventional US form, has four mounting holes 110 formed in it, and usually these mounting holes 110 have stamped embossments surrounding them such that they are more forward from vehicle V than is the rest of the license plate 108 (see also FIG. 7). In US embodiments, the centers of the mounting holes 110 uniformly are separated from each other by 7.0 inches (17.8 cm) horizontally and 4.75 inches (12.06 cm) vertically. In other countries these uniform spacings may be different.

Commonly, at least two, and often four, mounting screws 112 are used attach the license plate 108 to the vehicle bumper 104. Original equipment or substitute screws 112 are threaded through respective mounting tabs 114 of the assembly 100, through holes 110 in the license plate 108, and into the bumper mounting holes 106. While screws 112 sometimes are fashioned of nylon, more often they are steel, and as such will have a tendency to mar or otherwise damage any bumper of a second vehicle that they are permitted to impact. One of the objectives of the invention is to prevent any impact of the screws 112 or the (typically metal) plate 108 against the (now usually plastic) bumper of another vehicle.

The assembly 100 is annular or endless, defining a license plate sight 116 through which a large majority of the license plate 108 will be visible.

As will be detailed below, the assembly 100 preferably is formed from polymer compounds which, as solidified, are elastomeric. Therefore, while assembly 100 is planar, and may be affixed to a vertically planar structure on some vehicles, such as a niche or mounting plate (not shown), it can flex enough to conform to vehicle bumpers 104 which are slightly convex, as shown.

Figure 2:
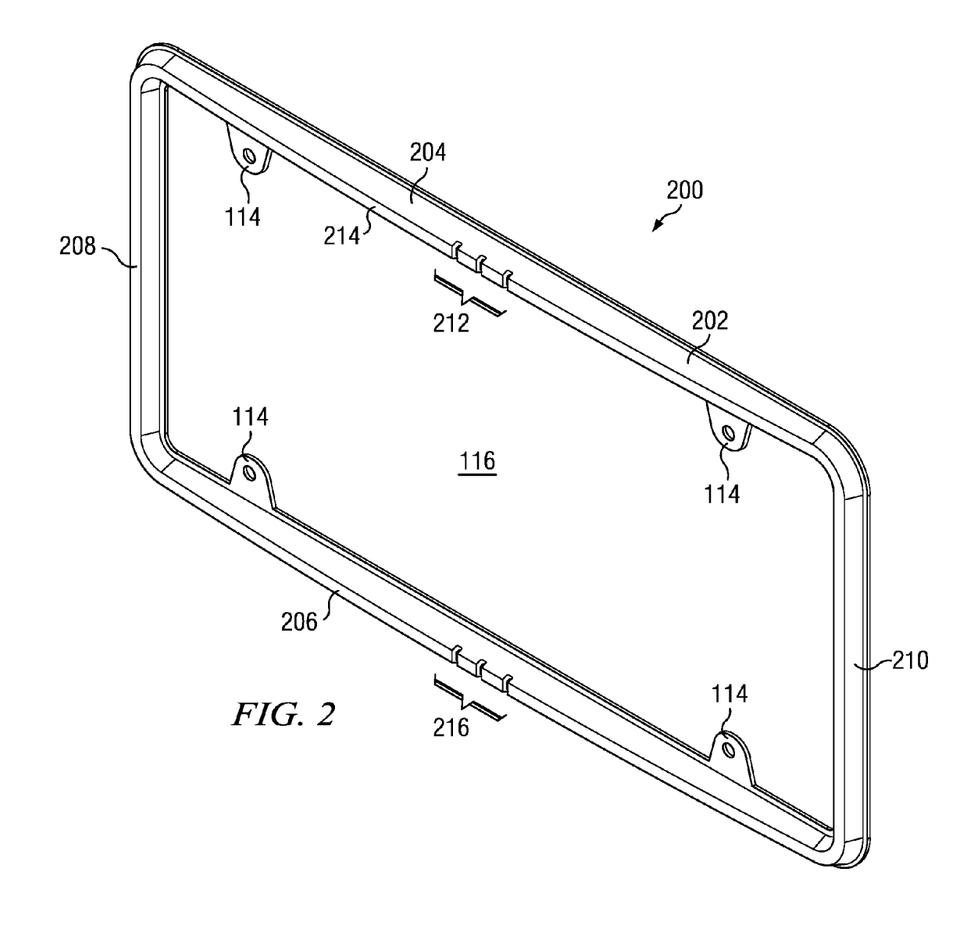
FIG. 2 is an isometric view of a substrate component of the license plate frame and bumper assembly shown in FIG. 1.

The assembly 100 includes two components: a substrate component 200 that is molded of a first polymer compound, a front isometric view of which is seen in FIG. 2, and an overmold component 400 (FIGS. 3 and 4A-4C) that is over-molded onto the substrate component 200. The overmold component 400 is formed of a second polymer compound, preferably a thermoplastic elastomer, which is chemically compatible with the first polymer compound, such that, upon overmolding, a strong cohesive bond is formed between the two. As solidified, the hardness of the overmold component 400 is less than a hardness of the substrate component. For example, substrate component 200 may have a Shore D durometer measurement in the range of 70 to 80, and more particularly may have a nominal Shore D durometer measurement of 72 as measured according to ISO 868, while overmold component 400 may have a Shore D durometer of 35 to 50 and more particularly may have a nominal Shore D durometer measurement of 40 as measured according to ISO 868. It should be understood that by "cohesive bond", the inventors mean to exclude the use of a separate adhesive or glue between the substrate component 200 and the overmold component 400. A cohesive bond exists as a result of direct molecular interaction between the substrate component 200 and the overmold component 400.

The first polymer compound is also selected to be tough and tear- and impact-resistant. For example, the first polymer compound (all properties given herein are for the compounds as solidified) can have a tensile modulus, as measured by ISO 527-1/2, of about 500-600 MPa, a parallel tear strength (ISO 34, 2 mm thick sample, Die C) of about 180-210 kN/m, and a normal tear strength (ISO 34, 2 mm thick sample, Die C) of about 170-210 kN/m. The first polymer compound can have a flexural modulus at 23° C., according to ISO 178, of 550-600 MPa, and a notched Izod impact strength at 23° C., according to ISO 180/1A, of 200-220 J/m.

The second polymer compound can exhibit a tensile modulus of about 50-55 MPa (ISO 527-1/2) and an initial tear resistance (ISO 34, 2 mm thick sample, Die C) of about 90-120 kN/m. The second polymer compound can have a flexural modulus (ISO 178, 23° C.) of 50-100 MPa and a notched Izod impact strength (ISO 180/1A, 23° C.) of "no break."

In one embodiment of the invention, the first and second polymer compounds are each chosen to be thermoplastic elastomers (TPEs). More particularly, the first and second polymer compounds may comprise polyester polyether block copolymers. Several plastics manufacturers offer a range of TPEs in different grades of hardness and elasticity. One such group of TPEs is sold under the mark HYTREL® by DuPont. This is a range of compositions, each of which substantially consist of a polyester polyether block copolymer having a hard or crystalline component that is a polybutylene terephthalate, and a soft or amorphous component based on long-chain polyether glycols. The inventors have found that HYTREL® 7246 works well as a license plate frame substrate, and that HYTREL® 4069 or 4556 works well in this system as an overmold component. Other TPE pairs can be used instead, such as those available from Celanese under the mark RITEFLEX®.

In alternative embodiments, other plastics may be chosen as substrates, so long as they have chemical compatibility with a softer, more elastomeric polymer compound chosen as the overmold component, so that a good cohesive bond is obtained between the two. The substrate/overmold system should have favorable interfacial tension, surface energy and melt viscosity. The substrate/overmold material pair preferably should be so chosen that when a sample of it is subjected to a "peel" test according to ASTM D429 Method B, its failure mode will be cohesive rather than adhesive, and that the cohesive failure will occur at or above about 10 pounds per linear inch or at or above about 1.8 N/m. While a pair of Hytrel compositions is preferred, the substrate component does not have to be a TPE. Substrate/overmold components alternatively could be specified as polycarbonate/Hytrel, polypropylene/SEBS TPE, or polypropylene/thermoplastic vulcanizate (TPV; e.g. Santoprene®).

Figure 3:
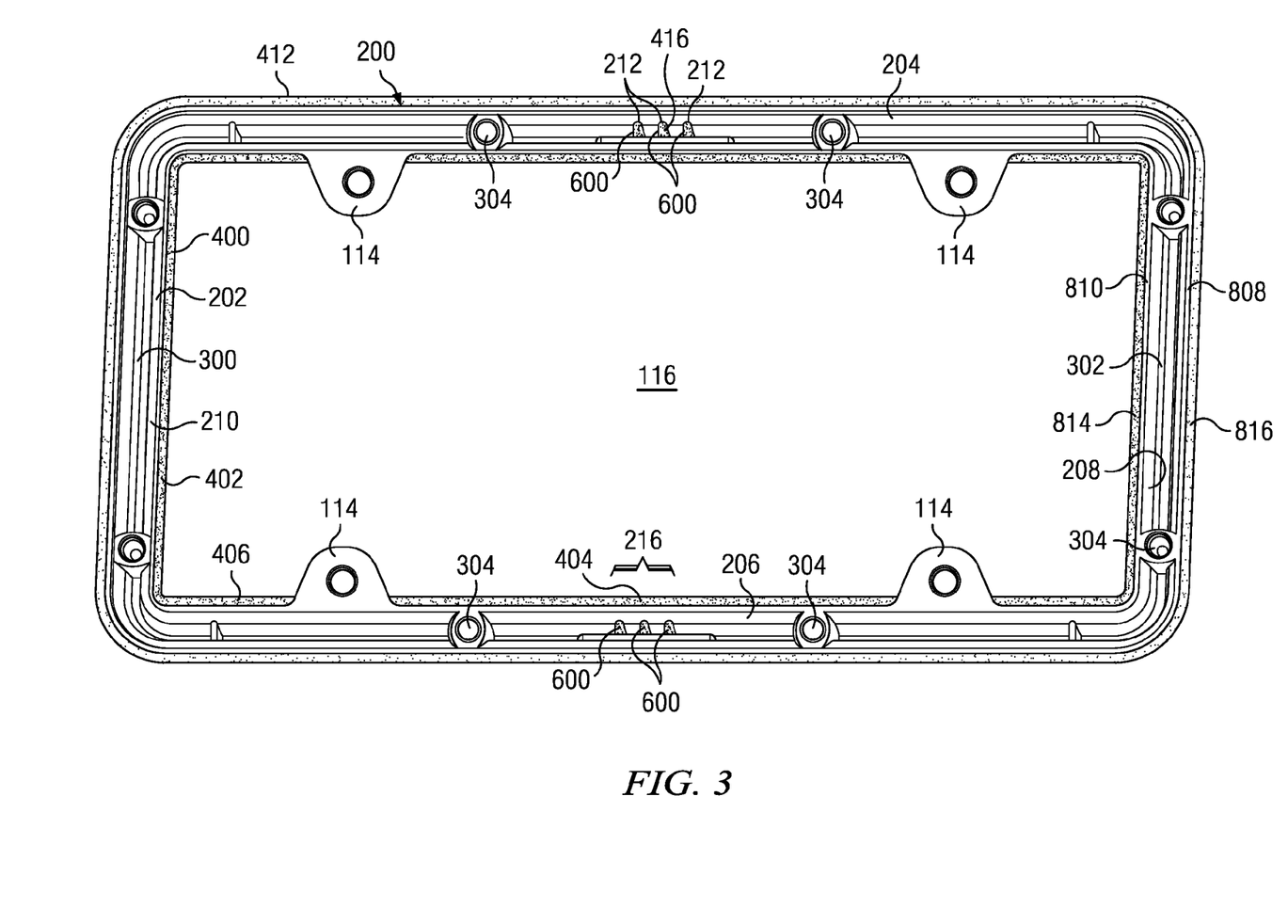
FIG. 3 is a rear view of the assembly shown in FIG. 1.

As seen for example in FIGS. 2 and 3, the substrate component 200 comprises a frame 202 and, extending vertically inwardly from the frame 202, four license plate screw mounting tabs 114. The frame 202 is endless, may take the shape of a rounded rectangle and may have an elongate top member 204, an elongate bottom member 206 in parallel to the top member 204, an elongate, vertically disposed left side member 208 that joins left ends of the top member 204 and the bottom member 206, and an elongate, vertically disposed right side member 210 that is parallel to left member 208 and that joins right ends of the top member 204 and the bottom member 206.

In one embodiment, at least the top member 204 has at least one vent 212 that extends from a forward face 214 of the substrate component 200 to a rearward face 300 thereof (see FIG. 3). In the illustrated embodiment, the top member 204 has three horizontally spaced-apart vents 212 near the center of the member 204. For ease in manufacture, so that the orientation of the substrate 200 is not critical relative to the second-shot mold (not shown) into which it is placed, these vents 212 are duplicated by vents 216, each of which extends from forward face 214 to rearward face 300 in bottom member 206.

Figure 7:
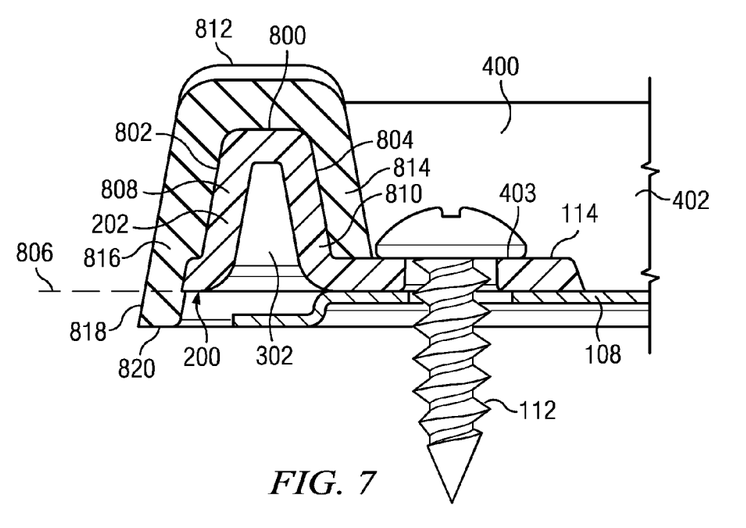
FIG. 7 is a cross-sectional detail taken through a license plate screw mounting tab and adjacent assembly structure.

As seen in FIGS. 3 and 7, the frame 202 and each of its members 204-210 may define a forward-extending channel 302 having walls which are substantially uniform in cross-sectional thickness (where the section is taken orthogonal to the frame member's direction of elongation) around the perimeter of the license plate sight 116. In an embodiment, the substrate component 200 further includes conical receptacles 304 that receive pins used in extracting the substrate 200 from its first-shot mold.

Figures 4A, 4B, 4C:
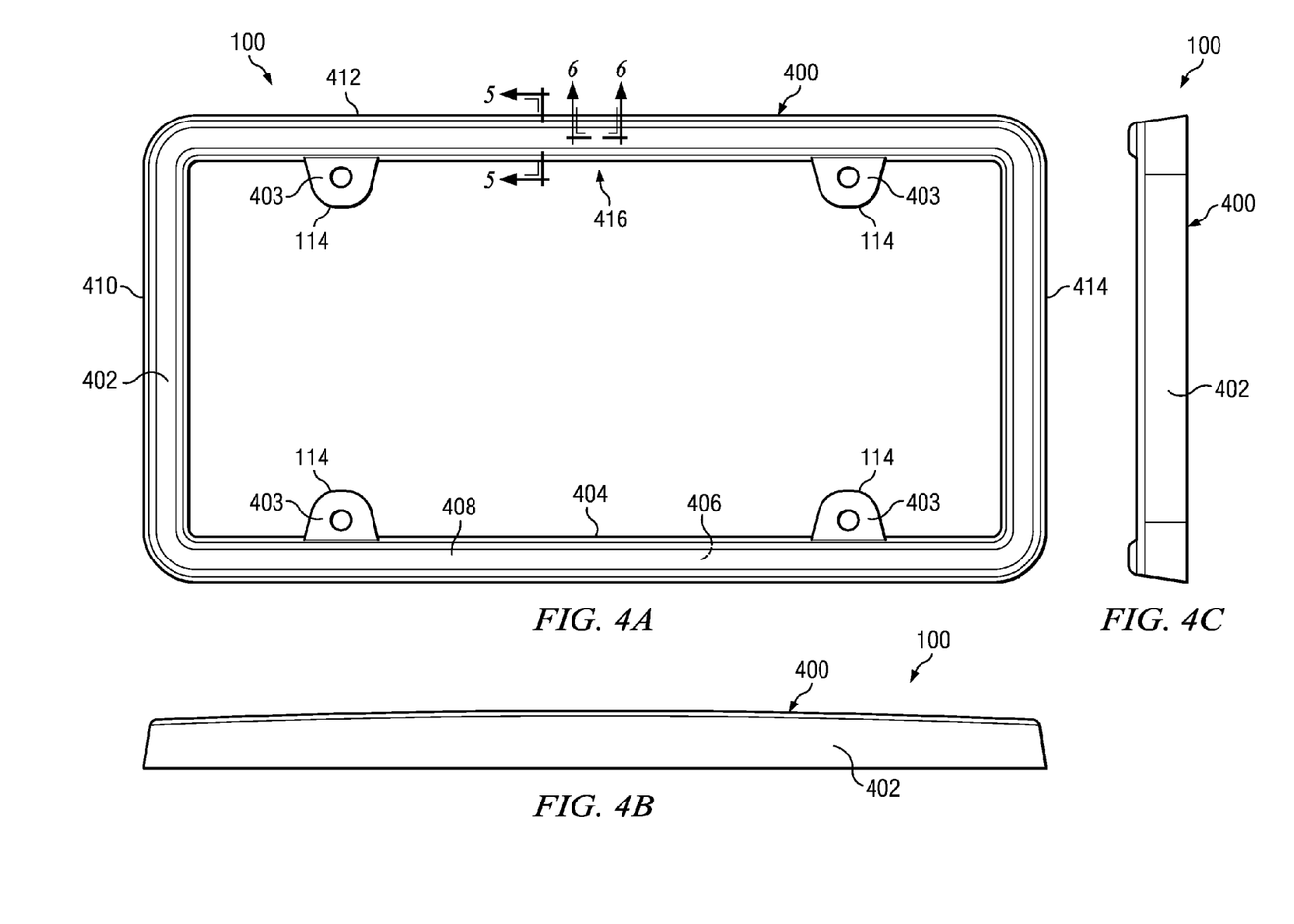
FIGS. 4A, 4B and 4C are front, top and side views of a license plate frame and bumper assembly.

FIGS. 4A-4C are different views of the assembly 100 after the overmold component 400 has been added to the substrate component 200 (FIG. 2). The overmold component 400 constitutes a bumper 402 that covers the front surface of frame 202, but intentionally does not cover the screw head-receiving areas 403 of the substrate component 200's mounting screw tabs 114. Hence, a first, relatively resilient and tough material may be specified to constitute the tabs 114, and a second, more elastomeric, softer material may be specified for the bumper 402. The material chosen for the tabs 114 will withstand the compression forces exerted on screw head-receiving areas 403 of tabs 114 by mounting screws 112, and tensile forces on tabs 114 transmitted through assembly 100, without tearing or failure. But the second polymer compound making up the bumper 402 can be specified to more yieldably absorb impacts occurring along a vector in parallel with axis X.

In the illustrated embodiment, an overmold fill point 404 is located on an interior side 406 of the bottom member 408 of the assembly 100. The fill point 404 corresponds to the location of the second-shot mold gate. Molten second polymer compound advances around the annular second-shot mold (not shown) into which has been placed the substrate component 200, creating a left part of bottom member 408, a left side member 410, and a left portion of a top member 412, all by molten polymer flowing in a clockwise direction from fill point 404; and creating a right, remaining part of the bottom member 408, a right side member 414, and a right portion of the top member 412, by molten polymer proceeding in a counterclockwise direction from fill point 404. Molten fronts of the molten second polymer compound meet approximately at vent(s) 212, which are disposed to be opposite the fill point 404. Vents 212 are at least approximately collocated with an end-of-fill point 416.

Figure 5:
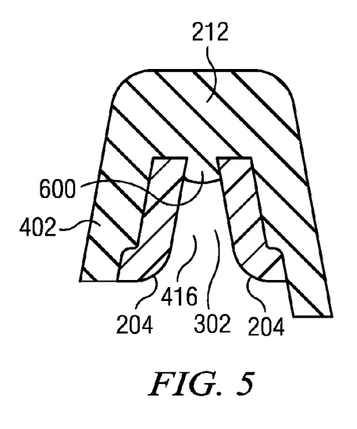
FIG. 5 is a cross-sectional detail taken substantially along line 5-5 of FIG. 4A.
Figure 6:
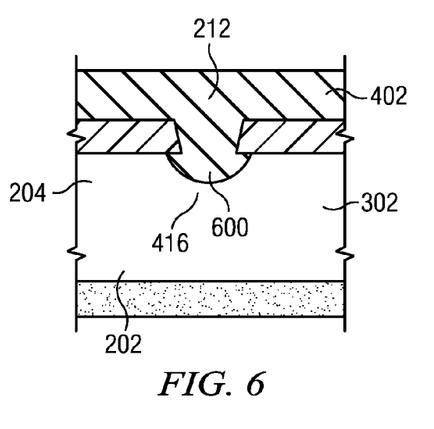
FIG. 6 is a cross-sectional detail take substantially along line 6-6 of FIG. 4A.

The interaction between the bumper 402 and the frame 202 at vents 212 is shown by the cross-sectional views of FIGS. 5 and 6, which are taken through neighboring ones of the vents 212. In the illustrated embodiment vents 212 are identical in form. The fronts of the molten second polymer compound will meet above vent(s) 212, pushing any gas before them and down through the vent(s) 212 into channel 302. The polymer compound will then fill the vent 212 and terminate in a portion 600 that is disposed within the channel 302. In this way, any visible imperfections in the bumper 402 from the overmolding process are obviated; there are no visible knit lines or voids. Forming the top member 204 to have a channel 302 affords a volume for the second polymer compound to slightly invade and into which gas may escape. The vents 212 (and 216) have additional utility in providing a mechanical lock of the overmold component 400 to the substrate 200; finally, as disposed in the center of the forward surfaces of top frame member 204 and bottom frame member 206, vents 212, 216 provide a joint around which the assembly 100 can preferentially flex, as might happen during the attachment of the assembly 100 to a somewhat convex vehicle bumper 104.

In FIG. 7, there is seen a cross section of the substrate frame 202 and overmolded bumper 402. The frame 202 (and each member 204-210 of it) have a forward surface 800 (upward in this figure). An outer surface 802 of frame 202 extends from surface 800 in a direction which is rearward and outward relative to axis X. An inner surface 804 extends from surface 800 in a direction which extends rearwardly and axially inwardly. The frame walls 808, 810 which respectively form the surfaces 802 and 804 terminate at a rearward plane 806, with which the rear surface of each mounting tab 114 is also coplanar. The walls 808, 810 also form the forward-extending channel 302, and their thickness is held to be at least similar to a predetermined uniform nominal wall thickness for the substrate component 200, such as 0.100 inches (0.25 cm).

In the illustrated embodiment, the bumper 402 is overmolded onto substrate component 200 to a predetermined nominal thickness that is substantially thicker than the nominal thickness of the substrate component, such as 0.150 inches (0.38 cm). More particularly the bumper 402 forms a cohesive bond with each of the frame surfaces 800, 802 and 804, increasing cohesive strength above that which would obtain if frame 202 were flat. Bumper 402 has a forward (in FIG. 7, upward) surface 812 which is the forwardmost surface of assembly 100. In this position, and as mounted on a vehicle bumper that has no license plate niche, upon a collision along axis X, the forward surface 812 will the first surface which touches the bumper of another vehicle or stationary object. Since it is composed of a relatively soft material, the chance that it will mar or superficially damage the bumper of the other vehicle is reduced. Further, and particularly as reinforced by frame 202, the bumper 402 is interposed between the other vehicle's bumper and the heads of (typically steel) screws 112 or license plate 108, and this removes the possibility of damage caused by colliding with these harder structures. Assembly 100 will also be able to absorb a modest amount of energy from any such impact, incrementally decreasing the amount of energy which otherwise will be transmitted to the vehicle bumper 104 upon which assembly 100 is mounted.

An inner flange or wall 814 of bumper 402 is cohesively bonded to frame surface 804. However, wall 814 terminates at the forward surface of screw mounting tab 114 and otherwise does not extend onto the screw head-receiving area 403 of tab 114, such that the screw 112 will not compress any of the material in bumper 402 when screw 112 is screwed into the vehicle bumper. An outer flange or wall 816 of bumper 402 is cohesively bonded to outer frame surface 802. The outer wall 816 is extended rearwardly by a perimeter lip 818 whose depth between plane 806 and the lip's rearward end 820, in an axial direction, is at least as great as the thickness of a stamped or embossed license plate 108. This license plate thickness typically is about 0.110 inches (0.28 cm). As shown, the license plate 108 typically is embossed at the sites of the mounting screw holes, and also has embossed lettering. The extended perimeter lip 818 provides cushioning against the vehicle bumper 104 or against a vehicle license plate mounting plate (not shown) substituted for it.

In summary, a vehicle license plate frame and bumper assembly has been described which has a substrate component molded from a first polymer compound, and an overmold component molded from a second polymer compound, where the second polymer compound is softer than but is chemically compatible with the first. Outer, forward and inner surfaces of the substrate frame increase the surface area to which the overmolded bumper is cohesively bonded. Only the substrate component is used to provide the screw mounting tabs. Fabricating the assembly from two polymer compounds means that properties of each compound can be more ideally selected for their different functions in the assembly.

While illustrated embodiments of the present invention have been described and illustrated in the appended drawings, the present invention is not limited thereto but only by the scope and spirit of the appended claims.

We claim:

1. A vehicle license plate frame and bumper assembly, comprising:
    a substrate component molded of a first polymer compound and an overmold component molded from a second polymer compound that is chemically compatible with the first polymer compound, the overmold component overmolded onto the substrate component to create a cohesive bond between the substrate component and the overmold component, a hardness of the second polymer compound as solidified being softer than a hardness of the first polymer compound as solidified;
    the substrate component including an elongate, endless frame disposed around a sight of a vehicle license plate, the assembly disposed, in use, in a substantially vertical plane that is substantially orthogonal to a vehicle axis of travel;
    the substrate component further including a plurality of vehicle license plate mounting screw tabs formed in parallel to said plane and extending vertically inwardly from the frame and each adapted to receive a vehicle license plate mounting screw; and
    the overmold component including a bumper overmolded onto the frame to extend at least axially forwardly therefrom, the overmold component not extending to cover screw head-receiving areas of the mounting screw tabs of the substrate component.

2. The assembly of claim 1, wherein the first polymer compound is a thermoplastic elastomer.

3. The assembly of claim 2, wherein the first polymer compound is a polyester polyether block copolymer thermoplastic elastomer.

4. The assembly of claim 2, wherein the second polymer compound is a thermoplastic elastomer.

5. The assembly of claim 4, wherein the second polymer compound is a polyester polyether block copolymer thermoplastic elastomer.

6. A vehicle license plate frame and bumper assembly, comprising:
    a substrate component molded of a first polymer compound and an overmold component molded from a second polymer compound that is chemically compatible with the first polymer compound, the overmold component overmolded onto the substrate component to create a cohesive bond between the substrate component and the overmold component, a hardness of the second polymer compound as solidified being softer than a hardness of the first polymer compound as solidified;
    the substrate component including an elongate, endless frame disposed around a sight of a vehicle license plate, the assembly disposed, in use, in a substantially vertical plane that is substantially orthogonal to a vehicle axis of travel, a front surface of the frame facing away from the vehicle including a forward face, an inner face extending rearwardly and inwardly relative to the axis from the forward face, and an outer face extending rearwardly and outwardly relative to the axis from the forward face; and
    the overmold component including a bumper overmolded onto the forward face, the inner face and the outer face of the frame.

7. The assembly of claim 6, wherein the frame has a rear surface opposed to the front surface thereof and, in use, facing the vehicle, a forwardly extending, hollow, endless channel formed in the rear surface of the frame such that a thickness of the frame, as taken in a section orthogonal to a direction of elongation of the frame, substantially conforms to a predetermined nominal wall thickness throughout the frame.

8. The assembly of claim 7, wherein the overmold component has a fill point adjacent the frame, at least one vent formed from the front surface of the frame to the rear surface of the frame at an end-of-fill location disposed across the license plate frame sight from the fill point, the vent discharging any gas pushed by the molten second polymer compound into the channel as the second polymer compound reaches the end-of-fill location during overmolding.

9. The assembly of claim 6, wherein the substrate component is bounded by a rear plane orthogonal to the axis, the outer face of the frame defining a perimeter, a lip of the bumper extending rearwardly from the rear plane by a predetermined distance throughout the perimeter, the predetermined distance preselected to be greater than or equal to a thickness of an embossed license plate.

10. The assembly of claim 6, wherein the first polymer compound and the second polymer compound are thermoplastic elastomers.

11. The assembly of claim 10, wherein the first polymer compound and the second polymer compound are polyester polyether block copolymer thermoplastic elastomers.

* * * * *